United States Patent [19]

Mizushiro et al.

[11] Patent Number: 4,732,928

[45] Date of Patent: Mar. 22, 1988

[54] HIGHLY ELASTIC THERMOPLASTIC ELASTOMER COMPOSITION

[75] Inventors: Ken Mizushiro, Fuchu; Hideo Morita, Yokohama, both of Japan

[73] Assignee: Asahi Kasei Kogyo Kabushiki, Osaka, Japan

[21] Appl. No.: 909,233

[22] Filed: Sep. 19, 1986

[30] Foreign Application Priority Data

Oct. 2, 1985 [JP] Japan ................. 60-218028

[51] Int. Cl.$^4$ .................. C08K 11/00; C08K 5/01
[52] U.S. Cl. .................... 524/505; 524/426; 524/423; 524/451; 524/456
[58] Field of Search .......................... 524/505

[56] References Cited

U.S. PATENT DOCUMENTS

| | | |
|---|---|---|
| 3,639,508 | 2/1972 | Kambour . |
| 3,994,856 | 11/1976 | Katchman et al. ............. 524/505 |
| 4,104,323 | 8/1978 | Hansen ............................ 524/505 |
| 4,141,876 | 2/1979 | Hansen ............................ 524/505 |
| 4,154,712 | 5/1979 | Lee ................................. 524/505 |
| 4,313,864 | 2/1982 | Haaf et al. ....................... 524/505 |
| 4,318,836 | 3/1982 | Abolins ........................... 524/505 |
| 4,525,508 | 6/1985 | Lee ................................. 524/505 |

FOREIGN PATENT DOCUMENTS

WO81/02020 7/1981 PCT Int'l Appl. .

Primary Examiner—Lewis T. Jacobs
Attorney, Agent, or Firm—Birch, Stewart, Kolasch & Birch

[57] ABSTRACT

A thermoplastic elastomer composition having superior compression set performance and moldability, comprising the following components (a) to (d):

(a) a styrenic block copolymer having in the same molecule at least two of polymeric block A mainly comprised of vinyl aromatic compounds and at least one of polymeric block B mainly comprised of conjugated diene compounds, and containing vinyl aromatic compounds in an amount of not less than 15% by weight and not more than 60% by weight;

(b) a styrenic block copolymer having in the same molecule at least one of each of polymeric block A mainly comprised of vinyl aromatic compounds and polymeric block B mainly comprised of conjugated diene compounds, and containing vinyl aromatic compounds in an amount of not less than 60% by weight and not more than 95% by weight;

(c) a polyphenylene ether resin having the reduced viscosity ranging from 0.15 to 0.70 in 0.5 g/dl of a chloroform solution at 30° C.; and (d) a non-aromatic rubber softening oil, and the contents of said components (a), (b), (c) and (d) in the composition satisfying the following formulae (1), (2) and (3) in weight ratio:

$$2.0 \geq b/a \geq 0 \qquad (1)$$

$$1.4 \geq c/(a+b) \geq 0.1 \qquad (2)$$

$$3.0 \geq d/(a+b) \geq 0.1 \qquad (3);$$

and a method for producing the thermoplastic elastomer composition comprising melt kneading the components (a) to (d) described above. The composition is useful in the field of automobile parts, electric wire coatings, footwear, toys, sundry goods, etc.

27 Claims, No Drawings

HIGHLY ELASTIC THERMOPLASTIC ELASTOMER COMPOSITION

TECHNICAL FIELD

In recent years, thermoplastic elastomers (hereinafter referred to as "TPEs"), which are rubber-like soft materials, require no vulcanizing step and have the same moldability as thermoplastic resins, have attracted attention in the field of automobile parts, electric wire coatings, footwear, toys, sundry goods, etc.

The present invention provides a highly elastic elastomer composition having these uses, the composition being soft, and having small compression set and excellent moldability.

BACKGROUND ART

Conventional TPEs have not reached the level of vulcanized rubber from a viewpoint of quality in the field of a use or uses shared by the vulcanized rubber among the extensive fields of applications as rubbers, and has been limited in their application to the field shared by vulcanized rubber.

In particular, at present, no TPEs have been available that are comparable to having the desired compression set of the vulcanized rubber.

Typical of these TPEs include a styrene/butadiene block polymer or a styrene/isoprene block polymer.

In styrenic TPEs, it has been impossible to obtain those having desired compression set unless the molecular weight of these TPEs are higher than a certain level, and, moreover, the TPEs of these types are very poor fluidity properties that can be achieved only by sacrificing the moldability which is a greatest advantage the TPEs have. Still further, the effect in the improvement tried for the compression set has been insufficient as compared with that of the vulcanized rubber.

Polyphenylene ethers, used in the present invention, are resins used as engineering plastics in a wide field of industries. As is well known in the present industrial field, the polyphenylene ethers can be used in combination with polystyrene to vary the thermal resistance of the polystyrene depending on the mixing proportion thereof.

With regard to the combination of styrenic block copolymers and polyethylene ethers, U.K. Patent Publication No. 1,275,141, for example, discloses that a combination of a polyphenylene ether with a polybutadiene-containing random or block copolymer (e.g. an A-B-A type block copolymer) optionally containing a styrenic copolymer brings about desired impact resistance and processability. This art teaches that a styrenic block copolymer is effective for improvement in the impact resistance of a styrenic resin combined with a polyphenylene ether resin.

U.S. Pat. No. 3,639,508 (or U.K. Patent Publication No. 1,274,050) discloses that a composition comprising 1 to 45% by weight of a polyphenylene ether and 99 to 55% by weight of a styrenic block copolymer (e.g. an A-B-A type block copolymer) shows improved heat strain resistance. In this connection, the heat strain resistance herein mentioned is a value obtained by measuring the temperature at which a sample hung under a fixed load (100 psi) with temperature increasing at the rate of 2.5° C./min has elongated by 10%. This measured value resembles the value according to the HDT test method which evaluates the thermal resistance of resins, and is a value for physical properties which is basically different from the compression set to be evaluated in the present invention.

International Publication No. WO 81/02020 also discloses that a composition comprising a hydrogenated A-B-A or unsaturated A-B-A block copolymer, a polyphenylene ether and a small amount of plasticizer selected from a phthalate, an alkyladipate and a paraffin type oil has good processability and impact resistance. This art also teaches that additon of a hydrogenated A-B-A type block copolymer or a non-hydrogenated A-B-A type block copolymer and a plasticizer is effective for improvement in the processability and the impact resistance of a polyphenylene ether resin, and is not directed to an invention aiming to improve a thermoplastic elastomer as in the present invention.

The present invention is essentially different from the inventions disclosed in the patents as described above as prior art. The composition obtained according to the present invention is a rubber-like soft material showing excellent compression set, and is a thermoplastic elastomer requiring no vulcanizing step and yet having the same moldability as ordinary thermoplastic resins possess.

The present inventors have made extensive studies on vinyl aromatic hydrocarbon type elastomer compositions having excellent compression set and moldability, and have discovered that a composition comprising (i) radial type or straight chain type block copolymers of which number average molecular weight and content of vinyl aromatic hydrocarbon are in a specified range [components (a) and (b)], (ii) a polyphenylene ether resin [component (c)] and (iii) a non-aromatic rubber softening oil [component (d)] has both the desired compression set and good fluidity. The present invention has been thus accomplished.

DISCLOSURE

The component (a) used in the present invention is a block copolymer having in the same molecule at least two of polymeric block A mainly comprised of vinyl aromatic compounds and at least one of polymeric block B mainly comprised of conjugated diene compounds.

Some of examples of the above component, include, when represented by general formulae, straight chain type block copolymers represented by A-B-A, A-B-(A-B)$_n$ wherein n$\geq$1, A-(B-A)$_n$ wherein n $\geq$2, or B-(A-B)$_n$ wherein n$\geq$2; or coupling type block copolymers represented by (A-B)$_n$-X-(B-A)$_m$ wherein n and m$\geq$1 and X is a coupling agent.

The polymeric block A mainly comprised of vinyl aromatic compounds mentioned in the present invention represents a copolymer of vinyl aromatic compounds with conjugated dienes which contains 50% or more by weight of the vinyl aromatic compounds, and/or a homopolymeric block of the vinyl aromatic compounds; and the polymeric block B represents a copolymer of conjugated dienes with vinyl aromatic compounds which contains 50% or more by weight of the conjugated dienes, and/or a homopolymeric block of the conjugated dienes.

The vinyl aromatic compounds present in the blocks of the copolymer may be uniformly distributed or may be distributed in a tapered fashion. The portions uniformly distributed and/or the portions distributed in a tapered fashion may be present in a plural number in the respective blocks.

The vinyl aromatic compound as described in the present invention is at least one selected from styrene, α-methylstyrene, p-ethylstyrene, 2,4-dimethylstyrene, vinyl naphthalene and a mixture thereof.

The conjugated diene compound is at least one selected from 1,3-butadiene, isoprene, 1,3-pentadiene, 2,3-dimethyl-1,3-butadiene, 2,3-dimethyl-1,3-butadiene, 3-butyl-1,3-octadiene, 4-ethyl-1,3-hexadiene and a mixture thereof.

The polymeric block B mainly comprised of the conjugated dienes is preferably a conjugated diene polymer containing 50% or more of a 1,4-structure. The content of less than 50% by weight of the 1,4-structure tends to result in lack of the rubberiness and too large compression set undesirably.

The block copolymer comprising the abovedescribed block A and block B contains vinyl aromatic hydrocarbons in an amount of not less than 15% by weight and not more than 60% by weight. The content of the vinyl aromatic hydrocarbons of less than 15% by weight may result in insufficient compatibility thereof with the polyphenylene ether resin undesirably. The content exceeding 60% by weight may result in insufficient rubbery softness and too large compression set thereof undesirably.

The block copolymer (a) used in the present invention has a molecular weight of not lower than 70,000 and not higher than 500,000 in the number average molecular weight Mn. In the present invention, the definitions for the molecular weight are all made by being calculated in terms of polystyrene according to the measurement by GPC (gas permeation chromatography) using THF (tetrahydrofuran) as a solvent. The number average molecular weight $\overline{M}n$ of lower than 70,000 may result in too large compression set undesirably, and that exceeding 500,000 may result in extremely poor process processability. The molecular weight is preferably in the range of from 80,000 to 300,000.

The component (b) used in the present invention is a block copolymer having in the same molecule at least one of each of polymeric block A mainly comprised of vinyl aromatic compounds and polymeric block B mainly comprised of conjugated diene compounds, and may be of either straight chain type or coupling type.

Some of examples of the above-described component include, when represented by general formulae, straight chain type block copolymers represented by A-B, A-B-A, A-B-(A-B)$_n$ wherein $n \geq 1$, A-(B-A)$_n$ wherein $n \geq 2$, or B-(A-B)$_n$ wherein $n \geq 2$; or coupling type block copolymers represented by (A-B)$_n$-X-(B-A)$_m$ wherein n and $m \geq 1$ and X is a coupling agent. The block A and the block B described here have the same meaning as in those of the component (a).

The component (b) contains vinyl aromatic compounds in an amount of not less than 60% by weight and not more than 95% by weight.

The component (b) is added for the purpose of improving the compatibility of the component (a) with the polyphenylene ether resin, and therefore it is effective for it to have larger content of the vinyl aromatic compounds than the component (a). The content exceeding 95% by weigh may result in substantially the same as a polystyrene homopolymer to lower the compatibility thereof with the component (a) undesirably.

The component (b) has a number average molecular weight of not lower than 30,000 and not higher than 300,000. The number average molecular weight of lower than 30,000 may result in too large compression set undesirably, and the one exceeding 300,000 may result in no improvement effect in the moldability, undesirably.

Styrenic block copolymers of the component (b) have been created and sold by various manufacturers as impact-resistant styrenic resins having transparency, and these may be used suitably.

Examples of these may include Asaflex (produced by Asahi Kasei), K-resin (produced by Phillips), Clearen (produced by Denki Kagaku), Styrolux (produced by B.A.S.F.), etc.

The polyphenylene ether resin (c) used in the present invention is a homopolymer or a copolymer comprising in its molecular chain a combining unit of the formula:

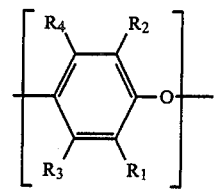

wherein $R_1$, $R_2$, $R_3$ and $R_4$ each are a substituent selected from the group consisting of a hydrogen atom, a halogen group, a hydrocarbon group (an alkyl group having 1 to 2 carbon atoms or phenyl group), a methoxy group and an ethoxy group, and they may be same or different from each other. There may be used those having the reduced viscosity ranging from 0.15 to 0.70, preferably from 0.20 to 0.65, when measured in 0.5 g/dl of a chloroform solution at 30° C. The reduced viscosity of the polyphenylene ether lower than 0.15 may result in a product in the state of an oligomer undesirably, and the viscosity exceeding 0.70 may result in decrease in the compatibility thereof with the styrenic block copolymers undesirably.

The polyphenylene ether used in the present composition shows good compatibility with the styrenic block copolymers when it has lower molecular weight, and therefore the one having somewhat lower reduced viscosity is preferable.

Typical examples of the polyphenylene ether may include 2,6-dimethyl-1,4-phenylene ether, 2,6-diphenyl-1,4-phenylene ether, 2,6-dimethoxy-1,4-phenylene ether, 2-methyl-6-phenyl-1,4-phenylene ether, etc., and may also include a polyphenylene ether copolymer such as a copolymer of 2,6-dimethylphenol with other phenols including, for example, 2,3,6-trimethylphenol and 2-methyl-6-butylphenol.

Of these polyphenylene ethers, 2,6-dimethyl-1,4-phenylene ether is most preferably used in the present invention.

In the present invention, the component (d), the non-aromatic rubber softening oil, is further added as another essential component. The addition of the non-aromatic rubber softening oil can increase softness without so much impairing the thermal resistance inherent to the composition, and at the same time can dramatically increase economical efficiency.

The softening oil for rubber is generally used for the purpose of softening, volume increase and improvement in the processability, of a rubber, and there may be used mineral oils called process oil or extender oil.

These mineral oils may include those called as aromatic type, naphthenic type and paraffinic type, and however in the present invention, paraffinic oils or naphthenic oils are used. The oil preferably used in the present invention is the paraffinic oil or the naphthenic oil containing not more than 5.0% by weight of aromatic components when measured by a method for analysis of the structure of petroleum products according to ASTN 2140-63T.

Oils having a large content of the aromatic components are not preferably used, since they tend to steeply increase the compression set of the composition.

In the present invention, the contents of the constituent components (a), (b), (c) and (d) in the composition is required to satisfy the following formulae in weight ratio:

$$2.0 \geqq b/a \geqq 0 \tag{1}$$

$$1.4 \geqq c/(a+b) \geqq 0.1 \tag{2}$$

$$3.0 \geqq d/(a+b) \geqq 0.1 \tag{3}$$

The component (b) block copolymer may not necessarily be added when the vinyl aromatic compounds are contained in a large amount in the component (a) block copolymer and the component (c) polyphenylene ether is contained in a small amount. However, when the vinyl aromatic compounds are contained in a relatively small amount in the component (a) block copolymer and the component (c) polyphenylene ether is contained in a large amount, the compatibility of the component (a) block copolymer with the component (c) polyphenylene ether may become insufficient, and, in the worst instance, separation of molded piece may sometimes occur during the injection molding.

The addition of the component (b) block copolymer is very effective for improving the compatibility of the component (a) copolymer and the component (c) polyphenylene ether. It also facilitates the improvement in the injection moldability.

The component (b) block copolymer should be added in an amount of 2-folds or less of the component (a) block copolymer. The addition in too much amount of the component (b) block copolymer may result in large compression set due to relative shortage of rubber components, undesirably.

The component (c) polyphenylene ether resin should be added in a proportion of not less than 10% by weight and not more than 140% by weight based on the sum of the component (a) block copolymer and the component (b) block copolymer. The amount of less than 10% by weight may result in insufficient improvement in the compression set, and the amount exceeding 140% by weight tends to result in relative lack of elongation undesirably when a resultant composition is subjected to a tensile test.

As the amount of addition of the component (c) polyphenylene ether becomes larger until about 1.2 times the sum of the component (a) block copolymer and the component (b) block copolymer within the range as defined by the formula (2), the compression set tends to be improved desirably.

There is shown a tendency that the most fundamental performance of rubber, such as the compression set, is improved even when the amount of the resin such as the polyphenylene ether having no rubber-like property at all is in the region of larger than the amount of the rubber-like component block copolymers. This is a quite unexpected result.

The component (d) oil is contained preferably in an amount of not less than 10% by weight and not more than 300% by weight based on the sum of the component (a) block copolymer and the component (b) block copolymer. The amount of less than 10% by weight may result in insufficiency in imparting the softness to the composition and also insufficiency in improving the processability. The addition of the oil in the amount exceeding 300% by weight is liable to result in bleedout of oils undesirably. From a viewpoint of improving the compression set performance, a desired tendency is shown as the amount of addition of the oil becomes larger within the range in which no bleedout occurs.

More preferably, in the present invention, the proportion of content of the constituent components (a), (b), (c) and (d) in the composition is within the range satisfying the following formulae (4), (5) and (6) in weight ratio:

$$1.0 \geqq b/a \geqq 0 \tag{4}$$

$$1.3 \geqq c/(a+b) \geqq 0.3 \tag{5}$$

$$2.5 \geqq d/(a+b) \geqq 0.3 \tag{6}$$

In working embodiments of the present invention;

(1) one or more of styrenic resins selected from the group consisting of polystyrene, high impact polystyrene, ABS resin, a styrene/acrylonitrile copolymer and a styrene/methyl methacrylate copolymer may be added within the range not exceeding 50 parts by weight based on 100 parts by weight of the composition recited in the claims of the present application; and (2) an inorganic filler selected from the group consisting of calcium carbonate, magnesium hydroxide, talc, white carbon, carbon black, titanium oxide and barium sulfate may be added within the range of from 0 to 300 parts by weight based on 100 parts by weight of the composition recited in the claims of the present application or the composition set forth in the working embodiments (1) as described above.

Addition of the styrenic resin in amount of not exceeding 50 parts by weight may retain good compatibility of the composition and may facilitate higher fluidity without steeply impairing the compression set performance.

Addition of the inorganic filler can achieve dramatical decrease in the cost of products and is also effective for preventing the bleed-out of oils. Incorporation of the inorganic filler in an amount exceeding 300 parts by weight may result in extreme lowering of the mechanical strength of the composition and also too high hardness thereof undesirably.

As a method for producing the composition of the present invention, a means comprising two steps can be usually taken.

First step is an oil absorption step. This step comprises weighing and mixing the respective components (a), (b), (c) and (d) to allow the oil of the component (d) to be sufficiently absorbed in the styrenic block copolymer of the component (a), thereby forming the whole mixture into a homogeneous solid. In this instance, when the oil is in an excessive amount, the mixture of the components (a), (b), (c) and (d) may be allowed to stand under heating at 50° to 90° C. or may be mixed under heating with use of a Henschel mixer to accelerate the absorption.

The second step is a step of melt kneading the mixture comprising the respective components (a), (b), (c) and (d).

In the case of the present invention, a mechanical melt kneading method is preferred, in which there are used a monoaxial extruder, a biaxial extruder, a Banbury type mixer, a variety of kneaders, a heating roll, etc. which are generally used for producing rubber compositions.

In the present invention, it is very important to carry out a thorough melt kneading. In case of insufficient melt kneading, no effect of the present invention will be exhibited.

As conditions for the production, it is important for the kneading to be sufficiently carried out in the resin temperature range of from 170° to 230° C. that may not cause deterioration of rubber, although it depends on the content of the polyphenylene ether resin.

It is also effective to use various kind of heat stabilizers in order to prevent the deterioration of rubber.

The composition obtained according to the present invention may be desirably incorporated, if necessary, with a flame retardant, glass fiber, carbon fiber, an antioxidant, a thermal resistant stabilizer, an ultraviolet absorbent, a hindered amine type stabilizer and a colorant.

The composition according to the present invention has superior compression set performance that could have not been achieved in the compositions comprising conventional styrenic block copolymers. The compression set percentage thereof is 60% or less when measured according to JIS K 6301 (70° C., 22 hrs, 25% compression). In a best case, it is even possible to obtain such a composition having the compression set percentage of 10% or less that may exceed a vulcanized rubber.

In addition, the present composition has so superior fluidity that all the processing means usually used in the molding of plastics, such as injection molding and extrusion molding, may be employed.

The composition of the present invention has a melt flow index of 0.1 g/10 min. or more according to JIS K 6870 (200° C., 5 kgf). This means that the composition has particularly excellent injection moldability.

EXAMPLES

The present invention will be described in greater detail by the following Examples, but by no means limited to these Examples.

Reference Example

In a 10 lit. autoclave, 4000 parts by weight of cyclohexane, 130 parts by weight of 1,3-butadiene monomer, 1.0 part by weight of n-butyllithium and tetrahydrofuran (THF) in the proportion of n-BuLi/THF =1/40 in molar ratio were introduced to carry out polymerization at 65° C. for 60 minutes, followed by addition of 200 parts by weight of styrene monomer to carry out polymerization for 45 minutes, by further addition of 470 parts by weight of 1,3-butadiene to carry out polymerization for 90 minutes, and, finally, by addition of 200 parts by weight of styrene monomer to carry out polymerization for 45 minutes, to synthesize a butadiene/styrene/butadiene/styrene type block copolymer (B-A-B-A).

This copolymer had the bound styrene content of 40%, the 1,2-vinyl bond content in butadiene units, of 35%, and the number average molecular weight of about 140,000 (calculated in terms of polystyrene).

Example 1, Comparative Examples 1 and 2

25 parts by weight of (a) component: a butadiene/styrene/butadiene/styrene type block copolymer represented by the general formula of B-A-B-A, synthesized in Reference Example, having a number average molecular weight of 140,000 and a bound styrene content of 40%, 25 parts by weight of (c) component: powdery poly-2,6-dimethyl-1,4-phenylene ether having a reduced viscosity of 0.57 (in 0.5 g/dl of chloroform solution at 30° C.); 50 parts by weight of (d) component: paraffinic oil (PS32, produced by Idemitsu Petrochemical Co., Ltd.); and further, as a heat stabilizer, 0.5 phr of Irganox 1010, tetrakis[methylene-3-(3',5'-di-tert-butyl-4'-hydroxyphenyl)propionate]methane

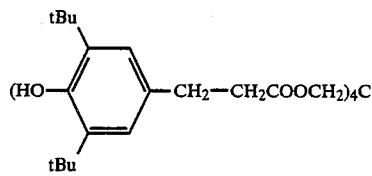

were thoroughly mixed with use of a Henschel mixer. The resultant mixture was allowed to stand for 2 hours in a bath kept at constant temperature of 70° C. until oil was perfectly absorbed.

Using a monoaxial extruder, extrusion was carried out at resin temperature of 180° C. to form pellets. The pellets obtained were formed into a melt-kneaded sheet by use of a heating roll having surface temperature of 205° C., followed by compression molding at 200° C. by use of a compression molding machine to produce a test piece.

This test piece was tested for the hardness (JIS A), the compression set test at 70° C. (JIS K6301) and the melt flow index text [Condition G in ASTM D-1238 (200° C.; load: 5 kg)]. Results are shown in Table 1.

As Comparative Examples 1 and 2, compositions having the makeup as shown in Table 1 were obtained in the same procedures as in Example 1. Physical properties thereof are also shown in Table 1.

TABLE 1

| Item | Example 1 | Comparative Example 1 | Comparative Example 2 |
|---|---|---|---|
| (a) component: block copolymer | 25 | 50 | 50 |
| (c) component: polyphenylene ether | 25 | 50 | — |
| (d) component: paraffinic oil | 50 | — | 50 |
| Hardness | 38 | 90 or more | 28 |
| Compression set (%) | 22 | 100 | 98 |
| Melt flow indes (g/10 min.) | 18 | Not flowed | 7 |

As shown in Table 1, the product according to Example 1 has both of very superior compression set performance and fluidity, while the composition of Comparative Example 1 is very poor in both the compression set and the fluidity, and that of Comparative 2 shows good fluidity and however very poor compression set.

It is seen from these results that all the components (a), (c) and (d) are all essential.

Examples 2 to 5, Comparative Examples 3, 4 and 5

Example 1 was repeated, except that there were used (a) component: a styrene/butadiene coupling type block copolymer represented by the general formula of (A-B)$_4$Si, having a number average molecular weight of 160,000 and a bound styrene content of 40%; (c) component: powdery poly-2,6-dimethyl-1,4-phenylene ether having a reduced viscosity of 0.57; and (d) component: paraffinic oil (PS32, produced by Idemitsu Petrochemical Co., Ltd.), to produce compositions having the makeup varied as shown in Table 2.

The makeup and the physical properties of the compositions are shown together in Table 2.

TABLE 2

| Items | Examples | | | | Comp. Examples | | |
|---|---|---|---|---|---|---|---|
|  | 2 | 3 | 4 | 5 | 3 | 4 | 5 |
| (a) component: block copolymer | 50 | 33 | 21 | 25 | 10 | 17 | 39 |
| (c) component: polyphenylene ether | 43 | 33 | 26 | 35 | 60 | 17 | 58 |
| (d) component: paraffinic oil | 7 | 34 | 53 | 40 | 30 | 66 | 3 |
| Hardness | 90 | 76 | 37 | 48 | 55 | 28 | 85 |
| Compression set (%) | 49 | 42 | 35 | 40 | 78 | 45 | 65 |
| Melt flow index (g/10 min.) | 1.2 | 2.7 | 31 | 22 | 2.9 | 60 | X* |

X*: Not flowed

As is apparent from the results shown in Table 2, all the compositions of Examples 2 to 5 show the compression set of 50% or less and the melt flow index of desired fluidity.

The composition of Comparative Exmple 3, in which the content of polyphenylene ethyl ether is outside the scope of the present invention, shows a large compression set.

The composition of Comparative Example 4, having too large content of oil, was found to be a test piece in which the bleedout occurred.

The composition of Comparative Example 5, having too small content of oil, shows poor fluidity.

Examples 6 to 10 and Comparative Examples 6 to 8

Example 1 was repeated, except that there were used (a) component: a coupling type block copolymer represented by the general formula of (A-B)$_4$Si, having a number average molecular weight of 280,000 and a bound styrene content of 22%; (b) component: a A-B-A type styrenic block copolymer having a number average molecular weight of 70,000 and a bound styrene content of 70%; (c) component; powdery poly-2,6-dimethyl-1,4-phenylene ether having a reduced viscosity of 0.57; and (d) component paraffinic oil (PX32, produced by Idemitsu Petrochemical Co., Ltd.), to produce compositions having the makeup varied as shown in Table 3.

The makeup and the physical properties of the compositions are shown together in Table 3.

TABLE 3

| Items | Examples | | | | | Comp. Examples | | |
|---|---|---|---|---|---|---|---|---|
|  | 6 | 7 | 8 | 9 | 10 | 6 | 7 | 8 |
| (a) component: block copolymer | 20 | 23 | 22 | 30 | 18 | 12 | 16 | 12 |
| (b) component: block copolymer | 10 | 11 | 17 | 15 | 15 | 25 | 5 | 6 |
| (c) component: polyphenylene ether | 25 | 26 | 21 | 15 | 23 | 21 | 34 | 12 |
| (d) component: paraffinic oil | 45 | 43 | 40 | 40 | 44 | 42 | 45 | 70 |
| Hardness | 28 | 45 | 48 | 58 | 30 | 52 | 60 | 22 |
| Compression set (%) | 9.0 | 27 | 36 | 49 | 16 | 63 | 63 | 58 |
| Melt flow index (g/10 min.) | 42 | 31 | 38 | 35 | 48 | 60 | 10 | 60 |

All of compositions of Examples 6 to 10 show superior compression set performance and fluidity.

The composition of Comparative Example 6, having too large content of the block copolymer (b) relative to the block copolymer (a), shows increased compression set.

The composition of Comparative Example 7, in which the content of polyphenylene ether based on the sum of the block copolymer (a) and the block copolymer (b) is outside the present invention, shows increased compression set.

The composition of Comparative Example 8, having too large oil content, was found to be a test piece in which the bleed-out occurred.

Comparing Examples 2 to 5 and Examples 6 to 10, large melt flow indices are attained in spite of larger molecular weight of the block copolymers (a) used in the latter. This means that the addition of the block copolymer (b) is effective for improving the fluidity.

Examples 11, 12, Comparative Examples 9 and 10

Example 1 was repeated, except that there were used (a) component: a coupling type block copolymer represented by the general formula of (A-B)$_4$Si, having a number average molecular weight of 250,000 and a bound styrene content of 40%; (b) component: a A-B-A type styrenic block copolymer having a number average molecular weight of 70,000 and a bound styrene content of 70%; (c) component: powdery poly-2,6-dimethyl-1,4-phenylene ether having a reduced viscosity of 0.28; and (d) component: four kinds of paraffinic oils (PW380 and PS32), naphthenic oil (KL-2P) and aromatic oil (AC12) produced by Idemitsu Kosan Co., Ltd., to produce compositions having the makeup as shown in Table 4.

The makeup and the physical properties of the compositions are shown together in Table 4.

TABLE 4

| Items | Examples | | Comp. Examples | |
|---|---|---|---|---|
|  | 11 | 12 | 9 | 10 |
| (a) component: block copolymer | 22 | 22 | 22 | 22 |
| (b) component: block copolymer | 17 | 17 | 17 | 17 |
| (c) component: polyphenylene ether | 18 | 18 | 18 | 18 |
| (d) component: paraffinic oil | PW90 | PS32 | KL-2p | AC12 |
|  | 40 | 40 | 40 | 40 |
| Hardness | 50 | 52 | 60 | 60 |
| Compression set (%) | 34 | 36 | 84 | 90 |
| Melt flow index (g/10 min.) | 42 | 43 | 40 | 41 |

Analyses of components of the oils used in Examples and Comparative Examples were carried out based on the analytical method according to ASTM 2140-63T to obtain the results as shown in Table 5.

TABLE 5

| Name of oil | $C_A$ % | $C_N$ % | $C_P$ % |
| --- | --- | --- | --- |
| Parfaffinic oil PW380 | 0 | 27 | 73 |
| Naphthenic oil PS32 | 0.1 | 32.8 | 67.1 |
| Aromatic oil KL2P | 13.5 | 39.5 | 47.0 |
| Aromatic oil AC12 | 42.2 | 31.3 | 26.5 |

$C_A$: Content of aromatic component in % by weight
$C_N$: Content of naphthenic component in % by weight
$C_P$: Content of paraffinic component in % by weight As will be apparent from Examples and Comparative Examples, the compositions employing oil containing a large amount of aromatic component steeply worsen the compression set.

EXAMPLE 13

Using a heating roll having a surface temperature of 205° C., 70 parts by weight of the pellets synthesized in Example 1 and 30 parts by weight of calcium carbonate (Whiton SB, produced by Shiraishi Calcium Co., Ltd.) were melt kneaded to be formed into a sheet, which was further compression-molded to produce a test piece.

This test piece had the hardness of 49, the compression set of 28 and the melt flow index of 8.

EXAMPLES 14 TO 21

Example 1 was repeated for the purpose of observing the effect of the addition of polyphenylene ether and the effect of the addition of oil, except that there were used the following four components consisting of (a) component: a straight chain type block copolymer represented by the general formula of A-B-A, having a number average molecular weight of 180,000 and a bound styrene content of 42%; (b) component: a A-B-A type block copolymer having a number average molecular weight of 70,000 and a bound styrene content of 70%; (c) component: powdery poly-2,6-dimethyl-1,4-phenylene ether having a reduced viscosity of 0.57; and (d) component: a paraffinic oil PS32 produced by Idemitsu Kosan Co., Ltd., to produce compositions having the makeup as shown in Table 6.

TABLE 6

| Items | Examples | | | | | | | |
| --- | --- | --- | --- | --- | --- | --- | --- | --- |
| | 14 | 15 | 16 | 17 | 18 | 19 | 20 | 21 |
| (a) component: block copolymer | 25 | 23 | 21 | 19 | 20 | 23 | 27 | 30 |
| (b) component: block copolymer | 15 | 14 | 13 | 12 | 12 | 14 | 16 | 19 |
| (c) component: polyphenylene ether | 21 | 19 | 18 | 39 | 37 | 26 | 15 | 5 |
| (d) component: paraffinic oil | 39 | 44 | 48 | 30 | 31 | 37 | 42 | 46 |
| Hardness | 65 | 42 | 28 | 67 | 67 | 68 | 51 | 28 |
| Compression set (%) | 52 | 32 | 21 | 23 | 18 | 30 | 51 | 59 |
| Melt flow index (g/10 min.) | 14 | 45 | 65 | 4 | 7 | 13 | 40 | 65 |

As is seen in Examples 14 to 16, the compression set can be improved and also the melt flow index can be increased by increasing the amount of paraffinic oil.

In Examples 17 to 21, the content of (c) component: polyphenylene ether were varied while keeping substantially constant the proportion of the components (a), (b) and (d) in the compositions. The compression set is improved as the content of polyphenylene ether increases up to about $(c)/[(a)+(b)] = 1.2$.

We claim:
1. A thermoplastic elastomer composition having superior compression set performance and moldability, consisting essentially of the following components (a) to (d):
   (a) a styrenic block copolymer having in the same molecule at least two of polymeric block A mainly comprised of vinyl aromatic compounds and at least one of polymeric block B mainly comprised of conjugated diene compounds, and containing vinyl aromatic compounds in an amount of not less than 15% by weight and not more than 60% by weight;
   (b) a styrenic block copolymer having in the same molecule at least one of each of polymeric block A mainly comprised of vinyl aromatic compounds and polymeric block B mainly comprised of conjugated diene compounds, and containing vinyl aromatic compounds in an amount of not less than 60% by weight and not more than 95% by weight;
   (c) a polyphenylene ether resin having the reduced viscosity ranging from 0.15 to 0.70 in 0.5 g/dl of a chloroform solution at 30° C.; and
   (d) a non-aromatic rubber softening oil, and the contents of said components (a), (b), (c) and (d) in the composition satisfying the following formulae (1), (2) and (3) in weight ratio:

$$2.0 \geq b/a \geq \qquad (1)$$

$$1.4 \geq c/(a+b) \geq 0.1 \qquad (2)$$

$$3.0 \geq d/(a+b) \geq 0.1 \qquad (3),$$

wherein the composition has a compression set of not higher than 60% as measured according to JIS K 6301 (70° C., 22 hrs., 25% compression).

2. The thermoplastic elastomer composition according to claim 1, wherein said styrenic block copolymer of the component (a) is of an A-B-A type, a B-A-B-A type or a copolymer represented by $(A-B)_n\text{-}X\text{-}(B-A)_m$ wherein X is a coupling agent and n and $m \geq 1$.

3. The thermoplastic elastomer composition according to claim 1, wherein said styrenic block copolymer of the component (b) is a straight chain type block copolymer of an A-B type, an A-B-A type or that represented by $\text{A-B-(A-B)}_n$ wherein $n \geq 1$, $\text{A-(B-A)}_n$ wherein $n \geq 2$, or $\text{B-(A-B)}_n$ wherein $n \geq 2$; or a coupling type block copolymer represented by $(A-B)_n\text{-}X\text{-}(B-A)_m$ wherein n and $m \geq 1$ and X is a coupling agent.

4. The thermoplastic elastomer composition according to claim 1, wherein said styrenic block copolymer of the component (a) has a number average molecular weight of not lower than 70,000 and not higher than 500,000.

5. The thermoplastic elastomer composition according to claim 2, wherein said styrenic block copolymer of the component (a) has a number average molecular weight of not lower than 70,000 and not higher than 500,000.

6. The thermoplastic elastomer composition according to claim 1, wherein said styrenic block copolymer of the component (b) has a number average molecular weight of not lower than 30,000 and not higher than 300,000.

7. The thermoplastic elastomer composition according to claim 3, wherein said styrenic block copolymer of the component (b) has a number average molecular weight of not lower than 30,000 and not higher than 300,000.

8. The thermoplastic elastomer composition according to claim 1, wherein said polyphenylene ether resin of the component (c) is a 2,6-dimethyl-1,4-phenylene ether resin.

9. The thermoplastic elastomer composition according to claim 1, wherein said non-aromatic rubber softening oil of the component (d) is a paraffinic oil containing not more than 5.0% by weight of an aromatic component as measured according to the analytical method of ASTM 2140-63T.

10. The thermoplastic elastomer composition according to claim 1, wherein the contents of the components (a) to (d) satisfy the following formulae (4), (5) and (6) in weight ratio:

$$1.0 \geq b/a \geq 0 \tag{4}$$

$$1.3 \geq c/(a+b) \geq 0.3 \tag{5}$$

$$2.5 \geq d/(a+b) \geq 0.3 \tag{6}$$

11. A thermoplastic elastomer composition according to any one of claims 1 to 10, wherein the composition has a melt flow index of not lower than 0.1 g/10 min. as measured according to JIS K 6870 (200° C., 5 kgf).

12. The thermoplastic elastomer composition according to claim 1, wherein the composition has a melt flow index of not lower than 0.1 g/10 min. as measured according to JIS K 6870 (200° C., 5 kgf).

13. A method for producing a thermoplastic elastomer composition having superior compression set performance and moldability, comprising melt kneading the following components consisting essentially of (a) to (d):
(a) a styrenic block copolymer having in the same molecule at least two of polymeric block A mainly comprised of vinyl aromatic compounds and at least one of polymeric block B mainly comprised of conjugated diene compounds, and containing vinyl aromatic compounds in an amount of not less than 15% by weight and not more than 60% by weight;
(b) a styrenic block copolymer having in the same molecule at least one of each of polymeric block A mainly comprised of vinyl aromatic compounds and polymeric block B mainly comprised of conjugated diene compounds, and containing vinyl aromatic compounds in an amount of not less than 60% by weight and not more than 95% by weight;
(c) a polyphenylene ether resin having the reduced viscosity ranging from 0.15 to 0.70 in a 0.5 g/dl of chloroform solution at 30° C.; and
(d) a non-aromatic rubber softening oil, in such a mixing proportion satisfying the following formulae (1), (2) and (3) in weight ratio:

$$2.0 \geq b/a \geq 0 \tag{1}$$

$$1.4 \geq c/(a+b) \geq 0.1 \tag{2}$$

$$3.0 \geq d/(a+b) \geq 0.1 \tag{3}$$

wherein the composition produced has a compression set of not higher than 60% as measured according to JIS K 6301 (70° C., 22 hrs., 25% compression).

14. The method for producing a thermoplastic elastomer composition according to claim 13, wherein said styrenic block copolymer of the component (a) is of an A-B-A type, a B-A-B-A type or a copolymer represented by $(A-B)_n-X-(B-A)_m$ wherein X is a coupling agent and n and $m \geq 1$.

15. The method for producing a thermoplastic elastomer composition according to claim 13, wherein said styrenic block copolymer of the component (b) is a straight chain type block copolymer of an A-B type, an A-B-A type or that represented by $A-B-(A-B)_n$ wherein $n \geq 1$, $A-(B-A)_n$ wherein $n \geq 2$, or $B-(A-B)_n$ wherein $n \geq 2$; or a coupling type block copolymer represented by $(A-B)_n-X-(B-A)_m$ wherein n and $m \geq 1$ and X is a coupling agent.

16. The method for producing a thermoplastic elastomer composition according to claim 13, wherein said styrenic block copolymer of the component (a) has a number average molecular weight of not lower than 70,000 and not higher than 500,000.

17. The method for producing a thermoplastic elastomer composition according to claim 14, wherein said styrenic block copolymer of the component (a) has a number average molecular weight of not lower than 70,000 and not higher than 500,000.

18. The method for producing a thermoplastic elastomer composition according to claim 13, wherein said styrenic block copolymer of the component (b) has a number average molecular weight of not lower than 30,000 and not higher than 300,000.

19. The method for producing a thermoplastic elastomer composition according to claim 15, wherein said styrenic block copolymer of the component (b) has a number average molecular weight of not lower than 30,000 and not higher than 300,000.

20. The method for producing a thermoplastic elastomer composition according to claim 13, wherein said polyphenylene ether resin of the component (c) is a 2,6-dimethyl-1,4-phenylene ether resin.

21. The method for producing a thermoplastic elastomer composition according to claim 13, wherein said non-aromatic rubber softening oil of the component (d) is a paraffinic oil containing not more than 5.0% by weight of an aromatic component as measured according to the analytical method of ASTM 2140-63T.

22. The method for producing a thermoplastic elastomer composition according to claim 13, wherein the contents of the components (a) to (d) satisfy the following formulae (4), (5) and (6) in weight ratio:

$$1.0 \geq b/a \geq 0 \tag{4}$$

$$1.3 \geq c/(a+b) \geq 0.3 \tag{5}$$

$$2.5 \geq d/(a+b) \geq 0.3 \tag{6}$$

23. A method for producing a thermoplastic elastomer composition according to any one of claims 13 to 23, wherein the composition has a melt flow index of not lower than 0.1 g/10 min. as measured according to JIS K 6870 (200° C., 5 kgf).

24. The method for producing a thermoplastic elastomer composition according to claim 13, wherein the composition has a melt flow index of not lower than 0.1 g/10 min. as measured according to JIS K 6870 (200° C., 5 kgf).

25. The method for producing a thermoplastic elastomer composition according to claim 13, wherein the melt kneading is carried out by a mechanical means.

26. The method for producing a thermoplastic elastomer composition according to claim 25, wherein said melt kneading is carried out by means of a monoaxial extruder, a biaxial extruder, a Banbury type mixer, a kneader or a heating roll.

27. The method for producing a thermoplastic elastomer composition according to claim 25, wherein said mechanical melt kneading is carried out at a temperature ranging from 170° to 230° C.

* * * * *